United States Patent [19]

Seeds et al.

[11] Patent Number: 5,536,520
[45] Date of Patent: Jul. 16, 1996

[54] SUBSTANTIALLY OIL FREE FRIED FLAVOR FOOD PRODUCT AND METHOD OF MAKING

[75] Inventors: W. R. Seeds, Waxahachie; William A. McMinn, III, Highland Village, both of Tex.

[73] Assignee: Country Flavor, Inc., Dallas, Tex.

[21] Appl. No.: 241,477

[22] Filed: May 12, 1994

[51] Int. Cl.⁶ .............................. A21D 2/34; A21D 2/36; A23D 7/015

[52] U.S. Cl. ..................... 426/549; 426/102; 426/553; 426/554; 426/578; 426/589; 426/618; 426/622

[58] Field of Search ........................... 426/102, 549, 426/553, 554, 578, 589, 618, 622

[56] References Cited

U.S. PATENT DOCUMENTS

| | | | |
|---|---|---|---|
| 5,139,809 | 8/1992 | Wienen et al. | 426/589 |
| 5,145,705 | 9/1992 | Seeds | 426/589 |
| 5,368,879 | 11/1994 | White et al. | 426/650 |

*Primary Examiner*—Helen Pratt
*Attorney, Agent, or Firm*—Henry Croskell

[57] ABSTRACT

A substantially oil free fried flavor food product having a fried flavor obtained by cooking a starch and/or a protein from grain flours, vegetable flours, food protein source materials and the like with fats and oils under controlled conditions for producing roux, extracting the oil from the roux resulting in a food product having a definitive fried or peak flavor as can be correlated by the color of the food product. The substantially oil free food product has enhanced fried flavor and is most suitable as an interface coating through enhanced adhesion properties for raw vegetables and consumable meats. The dry powder food product having fried flavor can be utilized in a variety of foods, either as an ingredient or coating, producing a consumable food having fried flavor without the food being fried in oil.

47 Claims, No Drawings

SUBSTANTIALLY OIL FREE FRIED FLAVOR FOOD PRODUCT AND METHOD OF MAKING

FIELD OF THE INVENTION

The invention generally relates to a substantially oil free powder food product having a fried flavor obtained by cooking a starch and/or a protein from grain flours, vegetable flours, animal protein source materials and the like with fats and oils under controlled conditions for producing roux, extracting the oil from the roux resulting in a food product having a definitive fried flavor as can be correlated by the color of the food product.

In another aspect, the invention relates to food coatings and dusting food product having definitive flavor as can be correlated by color of the substantially oil free powder food product.

In still another aspect, the invention relates to a substantially oil free fried flavor product or ingredient in batter coatings, breadings or crumb products suitable for conventional ovens, hot air convection ovens or microwave cooking, achieving fried flavor without oil frying.

In yet another aspect, the invention relates to use of the substantially oil free fried flavor food product as an ingredient in formed or extruded chips, coating for such chips wherein the chip achieve fried flavor without oil frying.

BACKGROUND OF THE INVENTION

Consumer market demand for fresh and frozen coated foods have been rapidly expanding in recent years as well as a demand for food products which have reduced oil content. The ability to formulate and apply batter-based coatings and breadings to a wide variety of products continues to be a challenge wherein a substantially oil free adhesive interface batter food product is needed. The market for coated foods is actually the market for various frozen battered and breaded meats and vegetable products intended for both retail and food service distribution. Demands on coated foods, i.e. batter and breadings of various food categories, are related to the lifestyle of the consumer and is driven by the lifestyle of the consumer which has become increasingly more critical of food product content, taste and appearance. One of the most important food chemist's considerations in coated foods is taste and there is no better way to enhance flavors and differentiate foods than with coatings.

Generally there are various definitions for batter-coated foods including interface/adhesion batter. This coating is typically used with a supplemental breading or bread crumb. The added breading is chosen for granulation, color, flavor, crispness and the like which is desired in the finished coated food. The interface coating serves primarily as an adhesive layer between the food surface and the breading.

After application of a coating, food may be either partially or completely cooked by frying or oven heating before being frozen. In some cases, however, cooking at this stage may be excluded entirely. The re-constitution of coated food products can be achieved through frying, oven heating and microwave heating. Presently the, optimum means for reconstituting coated foods is through deep fat frying from temperatures ranging from for example 176.7° to 204.4° C. Rapid heat transfer quickly sets the coating structure allowing little time for access of moisture. The generally undesired moisture is partially removed through exchange with oil during heating. This procedure is the method of choice for interface/adhesion coatings.

Oven heating is primarily used in the home and yields a moderately acceptable product in terms of crispness, flavor and color. However, a change, of temperature of the ovens causes some evaporation drying of the coating resulting in the perception of crispness. Of course this system can be improved by forced air convection type ovens. Coatings for oven use may require the addition of oil and/or browning agents to dry the coating mix and to more closely duplicate a fried appearance and flavor.

Microwave heating of presently available coating systems for reconstitution has not been found to be totally satisfactory. The main hurdle to success has been the basic heating and microwaving transmission which cannot be readily adapted to current coated foods. Reconstitution of heating from within pushes moisture and oil outward; however, the evaporative drying, typical of processing of convention ovens, does not occur. The result is a soggy coating with minimal crispness. Microwave reconstitution will require a unique technology for product development of coated foods.

Critical coating characteristics such as appearance, color, crispness, adhesion and flavor presently depend on batter and breading content additives and method for reconstitution. With the exception of flavor and mouth feel, appearance is most important to the consumer market and is affected by the amount and uniformity of the coating adhering to the food substrate. For example, thicker coatings made from a mixture of waxy rice flour and corn flour are very smooth and lack texture. This is due in part to the formation heavy gelatinized starch film. A thinner, less viscous coating from the same ingredients will allow air bubbles to appear on the surface and result in a more appealing texture.

Cooked color is closely tied with coating appearance. Color results from the absorption of frying oil, the density based on coating thickness and the chemical browning reaction of reducing sugars and protein sources. Color can be controlled by cooking method and medium, condition of the frying oil, ingredient composition and selection of supplemental breadings. In general, frying yields a greater degree of browning than convention oven baking and microwave ovens generally fail in producing adequate browning. Heating time and temperature are directly related to color development. Fried coated foods can also be affected by the type and age of the frying oil.

A lack of crispness, a difficult sensory impression to qualify may be defined either as a chewy toughness or a mushy softness, i.e. crunch vs. munch. A coating should ideally exhibit a structure that sufficiently resists the initial bite but then disappears with a quick melt away in the mouth. Crispness after cooking is a difficult attribute to maintain in a batter/breading system during extended frozen storage times. During frozen storage and transportation is also important for both the breading and the batter coatings to maintain uniform adhesion to the food substrate during the stresses involved. During reconstitution in the oven or fryer, the coating should not develop voids or pockets along the interface. Such coating separations known as shelling should be avoided. Typical deep fat frying can cause poor adhesion due to shrinkage of the substrate away from the cooked, coagulated coating. Precooking of the food substrate by steaming, simmering or boiling has been shown to improve its adhesion properties for coating application. A number of ingredients have been found to increase adhesion including polyphosphates, modified breadings, yeast proteins, vegetable oils, oxidized starches and vegetable gums.

Even if a coated food has exceptionally good color, texture and crispness, weak flavor can yield poor taste and off flavors can be disastrous. Flavor can be the result of additives and seasonings which modify fixed recipes. However, flavor also depends on the method, time and temperature of cooking the composition and characteristics of the cooking oil and the type of supplemental breading. The method of cooking can greatly affect flavor. For example, deep fat frying of coated chicken produces a significantly better flavor than does microwave cooking. Solutions have been attempted by adding cooked chicken skin to the batter formulation to intensify desirable flavor.

Various known methods and processes have been presented to solve these coated food problems. For example, U.S. Pat. No. 4,496,601 presents a process for preparing a coating mix containing a fried component. A flour based batter is deep fried in vegetable oil and then these resulting particles are used as a component of a coating mix which is designed to impart fried taste, texture and appearance to baked food stuffs. The resulting compositions may be applied to poultry, meat, fish and vegetables prior to baking in order to impart a simulated fried appearance, taste and texture. The food stuffs contemplated for use are uncooked such as fresh non-frozen foods which are coated with the composition immediately prior to baking. For example, the food stuffs which are suitable for use are chicken pieces and cutlets, porkchops and cutlets, fish fillets and eggplant strips.

Frozen comestible products suitable for microwave or oven cooking which when cooked are similar or superior in texture and appearance to a fat-fried comestible product is presented in U.S. Pat. No. 4,199,603. The food stuff products are prepared by coating frozen portions of said products with an edible oil containing a moisture absorbing substance such as pregelatinized starch, and then applying to the coated portions finely divided hygroscopic, crisp particulate, such as toasted bakery, cereal or carbohydrate particulate, capable on cooking of giving the appearance of a fat-fried product. The problem faced by the patent is in the use of microwave cooking of such batter coated frozen comestibles is that they have high water content and lose substantial amounts of free water in the cooking step. During fat-frying, the temperatures of cooking are sufficient to drive the water off. However during microwave cooking, the cooking temperatures and time are less and the cook-out juices and moisture saturate the conventional breaded batter coating making it mushy and giving it the taste of flour paste.

Pregelatinized starch food coatings are taught by U.S. Pat. No. 3,527,646 wherein an edible amorphous film containing a pregelatinized starch is an essential ingredient of the coating. Food coatings are known and used in the art primarily as flavor vehicles which are readily noted by the consumer and enjoyed because of their obvious effect on taste and palatability. Less well-known are functional food coatings which impart little or no flavor, are not readily noticed by the consumer and are used primarily to improve functional characteristics of a food, e.g. retention of volatile flavor components, inhibition of spoilage or prevention of sticking together and the like. The use of pregelatinized starch is directed mainly to functional food coatings by providing a film, thus a smooth, non-tacky coating which simplifies the packaging and handling of normally tacky or sticky foods or foods which become tacky by absorption or moisture.

Numerous attempts have been made in the industry to reduce frying oil absorption. Modest reduction in the absorbed cooking fat level have been achieved by removing excess fat after deep fat frying. Typical excess fat removal processes comprise passing the fried product over a vibrating screen to allow the fat to drain off or to use high velocity streams of hot air. In addition, various methods of solvent extraction of the absorbed fat are known. Such solvent extraction methods are not commercially practical usually due to problems associated with residual solvents or with impairment of the products textural and flavor attributes. U.S. Pat. No. 4,511,583 provides fried foods of reduced oil absorption through preparation and employment of sprays of film forming agents. Comestibles are prepared by first providing a battered and breaded coated comestible. An aqueous solution of a film forming agent such as gelatin in certain starches is applied to the comestible. The starch coated comestible is then pan fried in an edible fatty triglyceride at conventional temperatures until the batter is set and coating browned as desired. The resulted fried foods are characterized by reductions in absorbed cooking fat of up to about 25%.

A parallel food processing and food product which requires the same elements of appearance, color and flavor as batters and breadings, is the production of roux.

For example, U.S. Pat. No. 4,844,938 discloses a method for producing roux by drying flour until the moisture thereof is reduced to 0.5 to 10% by weight, adding fats and oil having a melting point of not more than 55° C. and a weight ratio of flour/fats and oils being of 1/5 to 1/0.25 then heating the mixture at a temperature of 65° to 130° C. for five to sixty minutes. The patent further teaches heating a similar mix in a two cycled heating process after the first cycle cooling and seasoning with processed milk products, extracts, starch and the like of from 0.3 to 4 parts by weight relative to one part by weight of total amount of mixture of dried flour and fats and oils and subjecting the result of mixture to a second heating and mixing process. A primary object of the reference is to provide a method for producing roux which makes it possible to eliminate the problems of powdery or grainy texture and raw material odor. Several of the prior art teachings provide methods for producing roux however, the roux has odor of raw materials since the ingredients are not heat treated at elevated temperatures. Moreover, such roux has a problem that it turns pasty when cooked.

In addition, U.S. Pat. No. 4,363,824 which addresses a process for the production of a food base instantaneously dispersible in water also presents as an object to provide a suitable heat treatment combined with a suitable choice of starting materials as a method for producing an instantaneously dispersable water roux or food base. The reference further addresses the issue that the required properties of roux cannot be obtained by temperature cycles. Although as normally assumed that it is only the temperature levels at which the fat is held and the holding times which are important in the heat treatments of fats, it has been found that controlled cooling is also crucial. The reference addresses a food base with a requirement of a binding effect without forming lumps when boiling water is poured onto the food base. In addition, the food base or roux is required to be storeable and not to agglutinate at room temperature.

Dry mixture compositions, which typically contain thickening agents such as starch or flour together with flavoring and coloring agents are widely used to prepare gravies and sauces. In preparing a roux from such a dry mix, the dry mix is dispersed in cold water and the dispersion gradually heated to boiling with constant agitation to gelatinize the starch and thereby thicken the liquid to the desired extent. This process must be carried out with care in order to avoid the formation of lumps in the thickened product. A number of procedures have been suggested in order to avoid the formation of lumps in the prepared gravies and sauces using a dry mix composition. For example, U.S. Pat. No. 4,415, 599 provides an improved dry mix composition for the preparation of gravies and sauces which contains a thickening agent, such as starch and/or flour, and maltodextrin, with the maltodextrin being present in the dry mix composition in an amount sufficient to provide a weight ratio of maltodextrin to thickening agent of at least 1:1.

A roux is a basic cooking ingredient used especially in French and Creole cooking as well as in Continental and Italian cooking and more recently, heavily relied upon by various fast food preparations. Roux is used for example, as a base for matting gravies, soups, sauces etc. In general, roux is made by cooking a mixture of flour and vegetable oil or other fat based substance until the desired cooked brown mixture is reached. In classical French cooking, the roux is made by mixing flour with melted butter. Various cookbook authorities define roux similarly for example, a generic term for various flour bindings. A roux is sometimes brown, sometimes white, according to the end use intended. If a thin sauce or gravy is required then, the amount of flour to oil is reduced. The color of the roux is gently brought to the desired shade by heating and stirring then the liquid ingredient by the recipe is added little by little and the sauce seasoned as desired and allowed to mellow. The drippings from a piece of roast meat is sometimes used instead of butter or cooking oils and fats thus, improving the flavor of the sauce if intended to be served with the roast.

Because fat is known to provide improved flavor consistency and mouth feel to foods, its use in certain food applications is highly desirable. For obvious reasons, concentrations containing a substantial proportion of fat or oil are generally not prepared in dry form. Advantageously, such concentrates are provided in tub configurations or the like similar to margarines. Although fat-containing concentrates in these forms provide a number of benefits in terms of convenience, stability and the like, their preparation generally involves expensive equipment and procedures. Heated mixtures of flour and fat used as thickeners in gravies, and as sauce bases and the like are known as roux. Flour and fat are combined in suitable proportions and amounts and heated for varying periods depending upon the type of roux desired. Preparation of conventional roux is time consuming and considerable care must be taken to avoid overheating and to achieve a smooth consistency.

The teachings of the prior art are generally concerned with methods for producing roux, gravies and sauces having smooth consistency being lump free when added to water or other cooking fluids. In addition, roux is prepared with various additives and flavorings in order to achieve end product gravies and sauces having desired taste and texture.

U.S. Pat. Nos. 5,145,705 and 5,206,0415 hereby incorporated by reference provide methods of producing fried flavor roux based product which adjusts the flavor intensity through a combination of heating, timing and quenching. Heating of a mixture of predried grain flours, flour mixtures or vegetable flours or equivalent products with a liquified shortening achieves various stages of caramelization which produce corresponding color changes. These color changes occur more rapidly as the temperature of the mixture increases. At the appropriate temperature and time combination, the caramelizing mixture is quenched in order to halt the caramelization reaction resulting in a particular roux base product having a fried flavor which is correlated to the roux base color. Such roux based products have been found to be dispersable with hot or boiling water or gravy sauces, soups and the like without the use of costly additives or flavor essence which can vary substantially from mix to mix.

The chip and snack industry represents another major food industry needing refinements including oil content reduction. At the present time, flavored coating for chips and snacks consist of a carrier such as whey, maltodextrin or some other inexpensive carrier. Flavors such as barbecue or ranch are added to the carder and applied topically to the chip. In this system, the adhesive properties of the carrier are very important because a certain amount of topical coating will fall off during handling. Also in this system, extra flavored material is added to overcome the taste of the carder, but add nothing to fried flavor since these products are generally fried in oil to achieve such fried flavor.

The present invention deals with the food chemistry of these roux based preparations which provide specific fried flavor, said flavors being correlatable to color. Upon extraction of oil from these roux based products, an essentially oil free dry powder food product having a definitive fried flavor also correlatable to color has been found which provides fried flavor powder food product having high adhesion properties for vegetables and meats alike. The substantially oil free dry powder food product having a definitive flavor is most suitable for interface, i.e. predust and batter applications as well as additives to breadings in the preparation of preprocessed foods and the like.

The present invention is directed to both functional food coatings as well as a flavor vehicle which provides the industry with extremely valuable benefits and advantages through improved functional and flavor characteristics of the predust, batter and breading which are added to food products thus utilizing the invention for improving the functional characterizations as well as flavor of the resulting end product consumer food item. Just as important, the final food product which is consumed by the public will be substantially oil free unless the product is further processed through fat frying. Fat frying is not necessary in view of the flavor enhancement achieved by the invention. Thus the present invention provides a method and a food product which not only provides functional adhesion enhancement of the food to the predust, batter and breading but provides a product which possesses for example, fried flavors, without the utilization of fat frying, the inventive products being achievable from fried flavor roux based materials from which the oil has been extracted.

SUMMARY OF THE INVENTION

It is industrially important to develop new and improved functional methods and products for producing interface predust and batters which have high adhesion to the food product as well as being substantially oil free and yet while providing fried flavor without actually fat frying. Such an inventive food products when utilized in predust, batters and breadings in pre-prepared foods are most suitable for hot air convection oven and conventional conduction oven cooking as well as radiation, microwave cooking while providing fried flavor without the oil.

Accordingly, it is an object of the present invention to provide the substantially oil free dry powder food products having a definitive fried flavor which is correlatable to color produced by extracting a major portion of the oil from a fried flavor roux base having a related definitive color and substantially the same fried flavor.

It is another object of the present invention to provide substantially oil free dry powder food products having fried flavor wherein the flavor essence of the food product is identifiable by color tone and yet the food product is capable of providing flavor enhancements to predust batters and breadings as well as an interface coating through enhanced adhesion properties for raw vegetables and all varieties of consumable meats from fish, fowl and animal source.

It is yet another object of the present invention to provide substantially oil free roux having less than about 15 to 10% by weight oil content.

The present invention has been completed on the basis of the finding that the aforementioned problems associated with conventional methods for producing predusts, batters and breadings of frozen pre-breaded products and the like can effectively be solved producing substantially oil free dry powder food products having a definitive fried flavor which is correlatable to a specific color. The substantially oil free dry powder food product is the result of extracting oil, from a roux of a caramelized grain flours, vegetable flours, protein source materials such as animal materials, yeast and the like; oil mixture, wherein the oil extracted dry powder food product has essentially the same definitive flavor as the roux before oil extraction. Surprisingly, the oil extracted dry powder food product, not the oil maintains the caramelized fried flavor. The oil extracted dry powder food product and the roux exhibiting parallel or related color. The roux and the substantially oil free dry powder food product having related color have the same fried flavor and related color. Slight flavor or mouth feel differences would obviously be present since the dry powder food product has no or essentially no oil present impacting the feel in the mouth of the taster. The flour which is caramelized with oil can be a vegetable flour or mixture of grain and vegetable flours or grain flours depending on the end result desired. For example, grain flours and potato starches can be utilized for producing the caramelized flour oil mixture and yet produce the substantially oil free dry powder food product of the present invention wherein the oil extracted dry powder food product and the caramelized flour, starch oil mixture exhibit parallel color ranges. In addition, protein source materials can be caramelized into roux which provide oil extracted food products having definite fried flavors. Grain flour is comprised of starch, protein and fat while vegetable flour is mostly a starch, however, all forms of flours, starches and protein sources can be utilized to form rouxs and the oil extracted food products having fried flavor. The substantially oil free dry powder food product is most suitable as a predust because of its high adhesive character. These products are most suitable for preparing fried flavor coated foods yet providing such produced coated and battered foods which are substantially oil free and do not require deep fat or fat frying in order to convey a fried flavor even though processed through hot air ovens and/or microwave heating. Utilization of the substantially oil free dry powder as an interface and replacing raw, pregelatinized or modified starches and the like, which presently make up the interface eliminates the current problems of the interface while also reducing the number of steps commonly used for coating preprocessed foods. Since the substantially oil free dry powder interface starches and proteins are already naturally pregelatinized and caramelized, process requirements can eliminate the step of precooking the product before freezing, thus eliminating a major cost.

Eliminating the precooking step, specifically by deep fat frying, substantially reduces or eliminates the oil content of the final product. The specifically processed rouxs from which substantially all of the oil has been extracted, do not interact with the moisture that is present, for example which occurs in the interface zone and available in the product during reconstitution, in the same manner as the presently used raw, chemically pregelatinized or modified starches. The use of the substantially oil free dry powder food product as an interface eliminates the soggy interface which results from presently used starches. In addition, these products bring a natural fried flavor to the end product. This flavor can be infinitely adjusted to meet consumer needs by applying the technology utilized in the roux based patents, i.e. adjustment of flavor as correlated by color, as well as other flavorings such as salt and spices which can be added to further enhance the flavor of the final product.

As batter technology evolves from art to science, the general role of ingredients is coming into focus. Many of these, such as starches and proteins, have been effectively modified for specific functional purposes. Of importance is the total ingredient profile of these coating systems and the interactions that can take place among these components. The present invention provides a component which is substantially oil free and can eliminate deep fat frying; possesses a fried flavor which is adjustable; provides a dry powder which has strong adhesion properties for vegetables, cheese and meats; and essentially eliminates added oil content of the finished food product utilizing the inventive component as part of the batter breading or as an additive.

DETAILED DESCRIPTION OF THE INVENTION

In accordance with the present invention, correlation of flavor and color of fried flavor substantially oil free fried flavor food products were discovered that allow a process and product having consistent taste. Since taste or flavor is something that is not physically measured by instrumentation and varies from palate to palate, the discovery of the food chemistry process of reaching a specific appropriate flavor as correlatable to color presents a significant advancement of the food industry and institutional food preparation services. Roux based materials have been developed which are comprised of a mixture of grain and vegetable flours, protein sources and fats or shortenings where upon heating of the mixture to a temperature for a specific time period produces a product of desired flavor and specific color. The time requirement can vary depending upon the temperature range and the specific components. In general the time will vary from about 2 minutes to about 60 minutes and more specifically from about 2 minutes to about 30 minutes. The temperature range can vary from about 250° F. to about 475° F. The roux product is cooked to a specific color and corresponding fried flavored taste followed by quenching of the roux in order to stop the caramelization food chemistry reaction at the appropriate color-flavored determination. The fried flavor roux base technology taught by U.S. Pat. Nos. 5,145,705 and 5,206,046 can be engineered to mimic an infinite number of caramelized flavors particularly fried flavor. The present invention produces a caramelized flavored dry powder food product which is substantially free of oil as a result of extracting the oil from these caramelized flavored rouxs, principally fried flavor rouxs. The vegetable flour protein, dairy powder protein or meat protein source products utilized as the powder for the fried flavor roux base technologies has been found to retain the flavor of the predecessor roux base even when substantially all of the oil is removed from the roux. The resulting oil extracted dry powder food product can be utilized for both flavor and functionally in various food applications providing fried food flavor without the need of frying in oil. The various natural flavor profiles that can be created make the oil extracted dry powder food product an ideal flavor enhancer for virtually all food products especially low-fat applications such as air-frying, convection ovens, and microwave cooking. Various applications for this oil extracted dry powder food product include for example, breadings, pre-dust, batters, sauces, extruded corn or potato chips, chip coatings and the like. The added benefit of this dry powder food product which carries the flavor of the roux is the adhesive property of the dry product for chips, meats, fresh vegetables, breading, predust and other food seasonings. The oil extracted dry powder food product also has certain functionalities in breading systems which eliminate many of the required preparation steps of preprepared frozen foods. The product, when used as a predust and/or batter, positively affects the interface between the meat substrate or the vegetable substrate and the outside crumb coating causing it to appear more like the interface of a naturally fried product.

The oil extracted dry powder food product having a definitive fried flavor results from extracting the oil to a substantially oil free level. Substantially oil free for the purpose of this invention is defined as oil levels by percent by weight of less than about 10%, preferably less than about 5% and even more preferably, less than about 2% oil content. The dry powder food product has the same fried flavor as the roux from which the oil has been extracted producing the dry powder food product. The roux having a fried flavor correlatable to a specific color and the oil extracted dry food product having the fried flavor of the roux also has a correlatable color; however, the color of the powder has a reduced numerical color range as a result of the absence of the extracted oil. Readdition of the extracted oil to the dry powder food product reproduces essentially the same color as the beginning roux color. Retention of the fried flavor of the caramelized flavor of the oil extracted dry powder food product which is unaffected by the removal of the oil provides a new food product which is applicable to vegetables as well as meats being prepared either in preprepared frozen packaging or freshly prepared which will be substantially fat free yet having the taste of fried foods without actually being fried.

Definitive characteristics of the oil extracted dry powder food product are enhanced both from the absence of oil and the absence of moisture. During the roux processing, it is theorized that not only all of the remaining moisture in the pre-dried flour or flour utilized in the roux is removed, also water molecules bonded to the starch molecules are broken off and removed from the roux during a rather violent cooking process. In either ease, the oil extracted powder food product is dry meaning the substantial absence of water. In addition, the substantially oil free dry powder food product is hydrophobic which promotes its effectiveness as an interface or breading material for meats and vegetables.

The oil extracted dry powder food product affects in a positive manner the interface of prebreaded products, that is the area between the product substrate and the outside crispy breading. Utilization of this dry powder food product solves many major industry problems related to frozen pre-breaded products meant for reconstitution in the conventional oven, convection oven, air fry oven and the microwave, both at the processor level and the consumer level. At the present time, the interface for frozen pre-breaded products are formulated using raw, chemically pregelatinized or modified starches of various origin. The starches are alternatively applied to the product substrate in the form of predust and liquid batters. The interface may also contain gums, stabilizers, flavorings and the like. The purpose of the interface is to carry spices and flavorings along with attaching the outside crispy breading to the product substrate.

Presently since the starches that make up the interface are raw, or only chemically pregelatinized or modified, the products must be precooked. This precooking is usually accomplished by steam, deep fat frying or hot air frying. When these prepared frozen pre-breaded products are reconstituted, the interface tends to become soggy. The result does not constitute a fried-like product and therefore has been an industry problem for many years. Additionally, products that are precooked with steam usually exhibit even more of the soggy problem because of the introduction of more moisture into the substrate. Presently to achieve a fried-like flavor, these foods are generally deep fried either in preparation of the prepackaged food or of the prepackaged food by the consumer.

The oil extracted dry powder food product of the invention is most suitable for replacing the raw, pregelatinized or modified starches. The dry powder products have been specially processed in oil, i.e. caramelized as a roux with oil and such process starches or proteins eliminate the current problems of interface dusting and breadings since the dry powder interface materials have already been caramelized and do not retain water. The processor may now eliminate the step of precooking the product before freezing, thus eliminating a major costly step. Elimination of this precooking step, especially by deep fat frying, substantially reduces or eliminates the oil content of the final product. The oil extracted dry powder food product specifically processed in oil, brings a natural fried in oil flavor to the end food product.

The elimination of precooking steps or the elimination of entirely the deep fried fat frying step either in pre-prepared foods or consumer preparation is achieved through utilization of the substantially oil free dry food powder product of the invention. For example, in the preparation of shrimp and seafood for frozen storage and later consumer usage, several steps are required. Presently after the various pre-dust batter additions and cooked crumb additions, the system requires a fried in oil to set the food product before freezing at about $-5°$ F. The frying in oil to set the food product is necessary to add the appropriate taste and consistency of the product for freezing which allows the end consumer to bake the product or again fry in oil. When utilizing the essentially oil free dry powder food product of the invention, no oil frying is required to set the product before freezing nor is there a requirement to later fry an oil by the consumer. The non-oil fried end food product having substantially oil free dry powder utilized in either the predust, batter or breading provides an oil fried flavor without the necessity of being oil fried either by the food processor or by the consumer. During cooking of the food products prepared presently utilizing flour, gelatinized starches and the like for pre-dust and batter ingredients, upon baking these products have a substantial water uptake in the batter and/or coatings leaving a mushy zone attributable to the water that cooks from the coated products and is retained by these batter zones. The same product prepared with the inventive dry powder food product eliminates or substantially reduces the mushy zone and is never required to be oil fried and can be reheated by the consumer, either in an air convection, conduction or radiation oven. The substantially oil free dry powder food product repels water and thus has no swelling due to water uptake during the reheating process by the consumer.

The substantially oil free dry powder food product in accordance with the invention is achieved by extracting the oil from the rouxs containing the oil. These rouxs can be composed of vegetable matter as a protein source as well as dairy and meat product protein sources plus added oil wherein the protein sources are cooked in the oil to produce a fried flavor roux of specific color. Oil can be extracted using various solvents either in a batch or continuous mode. Hexane for example can be utilized however several of the organic solvents leave residual solvent which may interfere with the flavor of the dry powder food product. In addition the liquid extraction medium can be a normally gaseous hydrocarbon, preferably propane, under a pressure sufficient to liquify the propane under conditions and temperatures of use. The propane is utilized either in batch or continuous mode within a pressure vessel before removal of the liquid propane solvent and the oil from the container or from the continuous system. The solvent extraction of the roux is simpler in some regards because the oil in the roux is an added oil and not placed by nature such as many oil extractions of vegetable matters, plants and the like, for pharmaceutical oil and food oil purposes. The use of liquid propane for example has been found to be most satisfactory in removing the oil from the dry powder product to levels of less than 5 and less than 2% by weight. These extraction processes are less demanding and require less energizing, stirring and the like than cracked or ground vegetable matter containing natural oils.

Various people in the past have devised methods, often using complex formulas, for quantifying color and expressing it numerically with the aim of making it possible for anyone to communicate colors more easily and more accurately. These methods attempt to provide a way of expressing colors numerically, in much the same way that we express length or weight. For example, in 1905 the American artist A. H. Munsell devised a method for expressing colors which utilized a great number of paper color chips classified according to their hue (Munsell Hue), lightness (Munsell Value), and saturation (Munsell Chroma) for visual comparison with a specimen color. Other methods for expressing color numerically were developed by an international organization concerned with light and color, the Commission Internationale de l'Eclairage (CIE). The two most widely known of these methods are the Yxy color space, devised in 1931 based on the tristimulus values XYZ defined by CIE, and the L*a*b* color space, devised in 1976 to provide more uniform color differences in relation to visual differences. *Color space: method for expressing the color of an object or a light source using some kind of notation, such as numbers. Color spaces such as these are now used throughout the world for color communication.

The L*a*b* color space, also referred to as CIELAB, is presently one of the most popular color space for measuring object color and is widely used in virtually all fields. It is one of the uniform color spaces defined by CIE in 1976 in order to reduce one of the major problems of the original Yxy color space: that equal distances on the x, y chromaticity diagram did not correspond to equal perceived color differences. In this color space, L* indicates lightness and a* and b* are the chromaticity coordinates.

The Hunter Lab color space was developed in 1948 by R. S. Hunter as a uniform color space which could be read directly from a photoelectric colorimeter (tristimulus method). Values in this color space are defined by the following formulas:

$$L = 100\sqrt{\frac{Y}{Y_0}}$$

$$a = 175\sqrt{\frac{0.0102X_0}{(Y/Y_0)}} \cdot \left[\left(\frac{X}{X_0}\right) - \left(\frac{Y}{Y_0}\right)\right]$$

$$b = 70\sqrt{\frac{0.00847Z_0}{(Y/Y_0)}} \cdot \left[\left(\frac{Y}{Y_0}\right) - \left(\frac{Z}{Z_0}\right)\right]$$

where

X, Y, Z: Tristimulus values of the specimen ($X_{10}$, $Y_{10}$, $Z_{10}$ tristimulus values can also be used.)

$X_0$, $Y_0$, $Z_0$: Tristimulus values of the perfect reflecting diffuser

For the 2° Standard Observer and Standard Illuminant C, the above equations would become:

$$L = 100\sqrt{Y}$$

$$a = \frac{1.75(1.02X - Y)}{\sqrt{Y}}$$

$$b = \frac{7.0(Y - 0.847Z)}{\sqrt{Y}}$$

Color difference $\Delta E_H$ in the Hunter Lab color space, which indicates the degree of color difference but not the direction, is defined by the following equation:

$$\Delta E_H = \sqrt{(\Delta L)^2 + (\Delta a)^2 + (\Delta b)^2}$$

where $\Delta L$, $\Delta a$, $\Delta b$: Difference in L, a, and b values between the specimen color and the target color The L*a*b* color space, also referred to as the CIELAB space, is one of the uniform color spaces defined by the CIE in 1976. The values of L*, a* and b* are calculated according to the formulas below:

Lightness variable L*:

$$L^* = 116\left(\frac{Y}{Y_n}\right)^{1/3} - 16$$

Chromaticity coordinates a* and b*:

$$a^* = 500\left[\left(\frac{X}{X_n}\right)^{1/3} - \left(\frac{Y}{Y_n}\right)^{1/3}\right]$$

$$b^* = 200\left[\left(\frac{Y}{Y_n}\right)^{1/3} - \left(\frac{Z}{Z_n}\right)^{1/3}\right]$$

where

X, Y, Z: Tristimulus values XYZ for 2° Standard Observer) or $X_{10}Y_{10}Z_{10}$ (for 10° Supplementary Standard Observer) of the specimen $X_n$, $Y_n$, $Z_n$: Tristimulus values XYZ (for 2° Standard Observer) or $X_{10}Y_{10}Z_{10}$ (for 10° Supplementary Standard Observer) of a perfect reflecting diffuser.

If X/Xn, Y/Yn, or Z/Zn is less than 0.008856, the above equations are changed as described below:

$$\left(\frac{X}{X_n}\right)^{1/3} \text{ is replaced by } 7.787\left(\frac{X}{X_n}\right) + \frac{16}{116}$$

$$\left(\frac{Y}{Y_n}\right)^{1/3} \text{ is replaced by } 7.787\left(\frac{Y}{Y_n}\right) + \frac{16}{116}$$

-continued $$\left(\frac{Z}{Zn}\right)^{1/3} \text{ is replaced by } 7.787\left(\frac{Z}{Zn}\right)+\frac{16}{116}$$

As used in the following examples and claims, color difference $\Delta E^*_{ab}$, in the L*a*b* color space, which indicates the degree of color difference but not the direction, is defined by the following equation:

$$\Delta E^*_{ab} = \sqrt{(\Delta L^*)^2 + (\Delta a)^2 + (\Delta b^*)^2}$$

where $\Delta L^*$, $\Delta a^*$, $\Delta b^*$: Difference in L*, a* and b* values between the specimen color and the target color.

In order to more clearly describe the nature of the present invention, specific examples will hereinafter be described. It should be understood, however, that this is done solely by way of example and is intended neither to delineate the scope of the invention or limit the ambient of the appended claims. In the examples and throughout the specification, percentages referred to percent by weight are based on the weight of the final product unless otherwise specified.

EXAMPLES

The following examples and color measurements were made with a Minolta CM-508d Spectrophotometer. Each sample was 5 grams and measured in the same size container to insure the exact distance between the material and the spectrophotometer. Each sample was measured at 112° F. to insure consistent measurements. Color measurements are expressed in the L*a*b* color space as defined by CIE in 1976.

Step One: Roux containing 50% oil and 50% starch or cheese by weight was caramelized to a certain level was measured for color.

Step Two: The caramelized roux was then solvent extracted to remove substantially all of the oil (approximately 97% by weight or greater). The resultant dry powder was then measured for color.

Step Three: Oil was then reintroduced and mixed with the caramelized powder to produce a 50% oil and 50% starch by weight the original amount and measured for color.

Examples 1, 2 and 3 are flour rouxs prepared in accordance with the teachings of U.S. Pat. Nos. 5,145,705 and 5,206,046 wherein a 50:50 oil and vegetable flour by weight were cooked to specific temperatures and measurable colors before being quenched. In Example 1 the flour/oil mixture was cooked to a temperature of 422° F. before quenching.

|  |  | Raw Data |  | Delta E |
|---|---|---|---|---|
| Roux |  | L* 27.96 |  | $\Delta L^*$ −68.71 |
|  |  | a* 8.23 |  | $\Delta a^*$ 8.39 |
|  |  | b* 26.32 |  | $\Delta b^*$ 26.53 |
|  |  |  |  | $\Delta E^*$ 74.13 |
| Powder |  | L* 51.31 |  | $\Delta L^*$ −45.46 |
|  |  | a* 5.25 |  | $\Delta a^*$ 5.41 |
|  |  | b* 23.97 |  | $\Delta b^*$ 24.18 |
|  |  |  |  | $\Delta E^*$ 51.69 |
| Powder + Oil |  | L* 25.98 |  | $\Delta L^*$ −70.69 |
|  |  | a* 9.16 |  | $\Delta a^*$ 9.32 |
|  |  | b* 21.61 |  | $\Delta b^*$ 21.82 |
|  |  |  |  | $\Delta E^*$ 74.57 |
| Comparison: | Oil + Powder | $\Delta E^*$ = | 74.57 |  |
|  | Roux | $\Delta E^*$ = | 74.13 |  |
|  |  |  | .44 | Variation |

|  | Raw Data | Delta E |
|---|---|---|
|  |  |  |

$\Delta E^*$ compiled number was determined using a target color from a Minolta white calibration standard with the following values:
L* 96.67
a* −.16
b* −.21

The roux of Example 2 was a 50:50 mixture of oil and vegetable flour cooked to a temperature of 225° F. before quenching.

|  |  | Raw Data |  | Delta E |
|---|---|---|---|---|
| Roux |  | L* 38.87 |  | $\Delta L^*$ −57.80 |
|  |  | a* 2.15 |  | $\Delta a^*$ 2.31 |
|  |  | b* 19.99 |  | $\Delta b^*$ 20.20 |
|  |  |  |  | $\Delta E^*$ 61.27 |
| Powder |  | L* 67.22 |  | $\Delta L^*$ −29.45 |
|  |  | a* .74 |  | $\Delta a^*$ .90 |
|  |  | b* 11.74 |  | $\Delta b^*$ 11.68 |
|  |  |  |  | $\Delta E^*$ 31.69 |
| Powder + Oil |  | L* 38.74 |  | $\Delta L^*$ −57.93 |
|  |  | a* 2.28 |  | $\Delta a^*$ 2.44 |
|  |  | b* 19.84 |  | $\Delta b^*$ 20.05 |
|  |  |  |  | $\Delta E^*$ 61.35 |
| Comparison: | Oil + Powder | $\Delta E^*$ = | 61.35 |  |
|  | Roux | $\Delta E^*$ = | 61.27 |  |
|  |  |  | .08 | Variation |

$\Delta E^*$ compiled number was determined using a target color from a Minolta white calibration standard with the following values:
L* 96.67
a* −.16
b* −.21

The roux of Example 3 was prepared from a 50:50 by weight mixture of flour and oil and cooked to a temperature of 350° F. before quenching.

|  |  | Raw Data |  | Delta E |
|---|---|---|---|---|
| Roux |  | L* 30.47 |  | $\Delta L^*$ −66.20 |
|  |  | a* 8.87 |  | $\Delta a^*$ 9.03 |
|  |  | b* 27.03 |  | $\Delta b^*$ 27.24 |
|  |  |  |  | $\Delta E^*$ 72.15 |
| Powder |  | L* 61.34 |  | $\Delta L^*$ −35.33 |
|  |  | a* 2.82 |  | $\Delta a^*$ 2.98 |
|  |  | b* 20.43 |  | $\Delta b^*$ 20.64 |
|  |  |  |  | $\Delta E^*$ 41.03 |
| Powder + Oil |  | L* 28.77 |  | $\Delta L^*$ −67.90 |
|  |  | a* 8.86 |  | $\Delta a^*$ 9.02 |
|  |  | b* 25.46 |  | $\Delta b^*$ 25.67 |
|  |  |  |  | $\Delta E^*$ 73.15 |
| Comparison: | Oil + Powder | $\Delta E^*$ = | 73.15 |  |
|  | Roux | $\Delta E^*$ = | 72.15 |  |
|  |  |  | 1.00 | Variation |

$\Delta E^*$ compiled number was determined using a target color from a Minolta white calibration standard with the following values:
L* 96.67
a* −.16
b* −.21

EXAMPLE 4

Preparation of a potato and biscuit flake roux (potato roux).

| Ingredients: | 800 g potato 7–40 granules |
|---|---|
|  | 400 g Bunge biscuit flakes - 100% soybean oil |
|  | 50% granules and flakes - 50% oil |

-continued

| Cooking Process: | Melt shortening in skillet and add potato granules. |
| --- | --- |
| | Mix well with mixer to make homogeneous. |
| | Continue to mix until mixture reaches 200° F. Take sample #1. |
| | Mix one minutes, and take sample #2, etc. |
| | Continue to stir throughout process and take a sample after every minute. |
| | Record temperature and time. |
| | Continue to take samples until product is burned and unusable. |
| Cooling Process: | Small samples are taken at one minute intervals and poured onto a cool, flat surface to cool to ambient room temperature. Samples are placed in a labeled bag for future color analysis. |

TABLE 1

| Sample No. | Temperature °F. | Time Cooked | Hunter L |
| --- | --- | --- | --- |
| 1 | 200° | 2:00 p.m. | 64 |
| 2 | 220° | 2:01 | 49 |
| 3 | 240° | 2:02 | 45 |
| 4 | 250.6° | 2:03 | 43 |
| 5 | 261° | 2:04 | 37 |
| 6 | 269° | 2:05 | 34 |
| 7 | 278.4° | 2:06 | 31 |
| 8 | 287.8° | 2:07 | 25 |
| 9 | 300.6° | 2:08 | 23 |
| 10 | 307.8° | 2:09 | 22 |
| 11 | 321° | 2:10 | 21 |
| 12 | 331.8° | 2:11 | 20 |
| 13 | 349.6° | 2:12 | 18 |
| 14 | 360° | 2:13 | 17 |
| 15 | 380.6° | 2:14 | 15 |
| 16 | 394.8° | 2:15 | 14 |
| 17 | 407.8° | 2:16 | 12 |
| 18 | 439° | 2:17 | 11 |
| 19 | 469° | 2:18 | 10 |

| | | Raw Data | Delta E |
| --- | --- | --- | --- |
| Potato Roux | | L* 16.92 | $\Delta$L* −79.83 |
| | | a* 11.99 | $\Delta$a* 12.09 |
| | | b* 18.31 | $\Delta$b* 18.55 |
| | | | $\Delta$E* 82.84 |
| Potato Powder | | L* 49.88 | $\Delta$L* −46.87 |
| | | a* 7.06 | $\Delta$a* 7.19 |
| | | b* 29.05 | $\Delta$b* 29.29 |
| | | | $\Delta$E* 55.73 |
| Potato Powder + Oil | | L* 16.55 | $\Delta$L* −80.20 |
| | | a* 11.51 | $\Delta$a* 11.61 |
| | | b* 21.23 | $\Delta$b* 21.47 |
| | | | $\Delta$E* 83.83 |
| Comparison: | Potato Oil + Powder | $\Delta$E* = | 83.83 |
| | Roux | $\Delta$E* = | 82.84 |
| | | | .99 Variation |

$\Delta$E* compiled number was determined using a target color from a Minolta white calibration standard with the following values:
L* 96.75
a* −.10
b* −.24

A 50:50 percent by weight powdered cheese oil mixture was caramelized to about 350° F. to produce the cheese roux as found in Example 6. The powdered cheese is a food product produced by Kraft® and is called "uncolored cheeztang" having a product no. 9378. Upon caramelization and production of the roux, the oil was extracted to about 3% by weight levels in the oil extracted dry powder food product was produced, the dry cheese powder food product having a specific color which is a reduced $\Delta$E* from the $\Delta$E* of the cheese roux, however upon readdition of the oil, $\Delta$E* is approximately the same as the $\Delta$E* of the cheese roux. The powdered cheese product is a dry powder substantially white in color while the cheese powder with the oil extracted has a definitive color a $\Delta$E* removed from the $\Delta$E* of the cheese roux. Here again the oil extracted dry powder food product, i.e. caramelized cheese powder contains the fried flavor of the cheese roux.

| | | Raw Data | Delta E |
| --- | --- | --- | --- |
| Cheese Roux | | L* 38.84 | $\Delta$L* −57.83 |
| | | a* 10.36 | $\Delta$a* 10.52 |
| | | b* 29.18 | $\Delta$b* 29.39 |
| | | | $\Delta$E* 65.72 |
| Cheese Powder | | L* 66.06 | $\Delta$L* −30.61 |
| | | a* 4.62 | $\Delta$a* 4.78 |
| | | b* 22.12 | $\Delta$b* 22.33 |
| | | | $\Delta$E* 38.19 |
| Cheese Powder + Oil | | L* 36.96 | $\Delta$L* −59.71 |
| | | a* 10.36 | $\Delta$a* 10.52 |
| | | b* 26.11 | $\Delta$b* 26.32 |
| | | | $\Delta$E* 66.10 |
| Comparison: | Cheese Oil + Powder | $\Delta$E* = | 66.10 |
| | Cheese Roux | $\Delta$E* = | 65.72 |
| | | | .38 Variation |

$\Delta$E* compiled number was determined using a target color from a Minolta white calibration standard with the following values:
L* 96.67
a* −.16
b* −.21

The following example tests were conducted to determine the adhesive properties of a caramelized substantially oil free flour powder (powder) compared to wheat flour (flour). The following materials were used:

1. 250 grams of powder
2. 250 grams of flour
3. 2 stainless steel bowls
4. 6 styrofoam bowls
5. Pringle's Potato Chips 250 grams of the powder and 250 grams of the flour were sifted separately through progressively smaller mesh screens. USA Standard Testing Sieve numbers 20, 30 and 40 were used as the sifters. The remaining powder and flour was then placed in separate stainless steel bowls.

In Example 7 (A-1, B-1) 40 individual Pringle's Potato Chips were counted and weighed. Pringle's were chosen specifically because of their uniform size and weight. This uniformity is critical because of the nature of these tests. For example, in Example 7, the weight difference between 40 chips weighed in two—20 count samples was only one tenth of a gram. After weighing for part A-1 of Example 7, 20 of the chips were dipped, one at a time, into the powder. The individual chip was rolled and coated 3 times. Then the chip was lifted by hand and shaken one time and placed into a styrofoam bowl. After doing 20 chips, the total weight of the 20 chips plus the accumulated powder was measured. Results are shown in A-1-A (predipped weight) and A-1-B (post-dipped weight). Next, 20 chips were weighed for part B-1 of Example 7. After weighing, the chips were dipped, one at a time, into the flour. The same coating procedure was used for B-1 as was used for A-1. The 20 chips plus the accumulated flour were weighed and results recorded as B-1-A (pre-dipped weight) and B-1-B (post-dipped weight).

In Example 8 and Example 9, all of the chips were coated using the procedure of Example 1 except that, after coating, the individual chip was tapped six times on the side of the stainless steel bowl in an effort to remove as much excess powder and flour as possible.

EXAMPLE 7

| Run Number | | | | |
|---|---|---|---|---|
| A-1 | 20 Pringle chips | A-1-A 40.6 grams | A-1-B chips plus powder 73.1 grams | 80% increase by weight |
| B-1 | 20 Pringle chips | B-1-A 40.7 grams | B-1-B chips plus flour (dried) 68.6 grams | 68.5% increase by weight |

Percent increase adhesion powder vs. flour 16.8% (dipped only - no tapping)

EXAMPLE 8

| Run Number | | | | |
|---|---|---|---|---|
| A-2 | 20 Pringle chips | A-2-A 40.6 grams | A-2-B chips plus powder 50.4 grams | 24.14% increase by weight |
| B-2 | 20 Pringle chips | B-2-A 40.6 grams | B-2-B chips plus flour (dried) 46.5 grams | 14.53% increase by weight |

Both A-2 and B-2 coated chips were tapped six times
Percent increase adhesion powder vs. flour 66.1%

EXAMPLE 9

| Run Number | | | | |
|---|---|---|---|---|
| A-3 | 20 Pringle chips | A-3-A 41.3 grams | A-3-B chips plus powder 50.1 grams | 21.3% increase by weight |
| B-3 | 20 Pringle chips | B-3-A 40.9 grams | B-3-B chips plus flour (dried) 46.1 grams | 12.7% increase by weight |

Both A-3 and B-3 coated chips were tapped six times
Percent increase adhesion powder vs. flour 67.7%

The results of the Examples 7, 8 and 9 show that a significantly greater amount of powder would adhere to the chips compared to the flour. In fact, in test two and three, where an effort was made to remove the powder and flour from the chips, the powder adhered at a rate of about 66% higher with the powder than the flour.

Raw vegetables such as potatoes or sliced potatoes could have a topical application which would eliminate prefrying. The potatoes could then be reconstitutes in convectional, conduction or radiation ovens.

The substantially oil free fried flavor food products according to the invention are most suitable as an ingredient or as a coating in the chip and snack industry achieving fried flavor without oil frying of the chips. Using the substantially oil free fried flavor food powder of the invention, the chip and snack manufacturer has the luxury of having the fried flavor of the powder engineered to match the fried flavor of the chip or snack. Also since the powder has superior adhesive properties a smaller amount can be used to carrier the same flavor intensity.

Air fried or baked chips and snacks can be dusted with the flavor engineered powder to give the chip the correct fried flavor. The powder can also be used as a particular engineered fried flavor powder can be added to the formula for corn chips or other extruded or formed emulsion based chips, such as Pringles®, and air fried thereby making an oil free chip that tastes like it was fried.

The terms and expressions which have been employed are used as terms of description and not of limitation, and it is not intended in the use of such terms and expressions to exclude an equivalence of the feature shown and described or portions thereof, since it is recognized that various modifications are possible within the scope of the invention claimed.

What is claimed is:

1. An oil extracted dry powder food product having a definitive fried flavor comprising:

a dry powder food product substantially oil free from an oil extracted caramelized roux of vegetable flour and oil mixture;

the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a L* a* b* color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

2. The oil extracted dry powder food product according to claim 1 wherein the product is from 90–99.5% by weight free of oil.

3. The oil extracted dry powder food product according to claim 2 wherein the product is from 95–99.5% by weight free of oil.

4. The oil extracted dry powder food product according to claim 3 wherein the powdered food product is moisture free and has increased adhesion to dry food surfaces of at least 60% greater than dry flour.

5. The oil extracted dry powder food product according to claim 1 wherein the vegetable flour is comprised of a grain flour.

6. The oil extracted dry powder food product according to claim 5 wherein the grain flour is wheat flour.

7. The oil extracted dry powder food product according to claim 5 wherein the grain flour is comprised of starch, protein and fat.

8. The oil extracted dry powder food product according to claim 1 wherein the vegetable flour is comprised of starch.

9. The oil extracted dry powder food product according to claim 1 wherein the vegetable flour is comprised of protein.

10. The oil extracted dry powder food product according to claim 1 wherein the vegetable flour is comprised of starch and protein.

11. The oil extracted dry powder food product according to claim 1 wherein the vegetable flours are mixed with protein from animal source materials, yeast, and grain flour protein.

12. The oil extracted dry powder food product according to claim 1 wherein the $\Delta E^*ab$ of the roux and the $\Delta E^*ab$ color of the dry powder food product plus readded extracted oil has essentially the same color ±2%.

13. An oil extracted dry powder food product having a definitive fried flavor comprising:

a dry powder food product substantially oil free from an oil extracted caramelized roux of potato starch and oil mixture;

the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a $L^*$ $a^*$ $b^*$ color space, the reduced $\Delta E^*ab$ color being the result of the absence of the extracted oil;

retention of the specific fried flavor of the roux is in the dry powder food product; and the dry powder food product plus readdition of the extracted oil has essentially the same color as the roux as measured by the $\Delta E^*ab$.

14. The oil extracted dry powder food product according to claim 13 wherein the potato starch is mixed with vegetable flour.

15. The oil extracted dry powder food product according to claim 13 wherein the potato starch is mixed with protein from animal source materials, yeasts and grain flour protein.

16. The oil extracted dry powder food product according to claim 13 wherein the powdered food product is moisture free and has increased adhesion to dry food surfaces of at least 60% greater than dry flour.

17. An oil extracted dry powder food product having a definitive fried flavor comprising:

a dry powder food product substantially oil free from an oil extracted caramelized roux of dairy protein powder and oil mixture;

the roux having a fried flavor correlatable to a specific color and the oil extracted dry food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a $L^*$ $a^*$ $b^*$ color space, the reduced $\Delta E^*ab$ color being the result of the absence of the extracted oil;

retention of the specific fried flavor of the roux is in the carbohydrates of the dry powder food product; and the dry powder food product readdition of the extracted oil has essentially the same color as the roux as measured by the $\Delta E^*ab$.

18. The oil extracted dry powder food product according to claim 17 wherein the dairy protein is mixed with grain flour.

19. The oil extracted dry powder food product according to claim 17 wherein the dairy protein powder is mixed with vegetable starch.

20. An oil extracted dry powder food product having a definitive fried flavor comprising:

a dry powder food product substantially oil free from an oil extracted caramelized roux of meat protein product and oil mixture;

the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a $L^*$ $a^*$ $b^*$ color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

21. The oil extracted dry powder food product according to claim 20 wherein the meat protein is mixed with vegetable starch.

22. The oil extracted dry powder food product according to claim 20 wherein the meat protein is mixed with grain flour.

23. An adhesive interface food product having definitive flavor comprising:

an oil extracted dry powder food product having a definitive fried flavor;

the moisture free dry powder food product substantially oil free, 95–99.5% by weight oil, from an oil extracted caramelized roux of vegetable flour and oil mixture;

the moisture free dry powder food product substantially oil free having an adhesion to dry food surfaces of at least about 60% greater than moisture dry flour;

the roux having a fried flavor correlatable to a specific color and oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a $L^*$ $a^*$ $b^*$ color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

24. The oil extracted dry powder food product according to claim 23 wherein the vegetable flour is comprised of a grain flour.

25. The oil extracted dry powder food product according to claim 24 wherein the grain flour is wheat flour.

26. The oil extracted dry powder food product according to claim 23 wherein the grain flour is comprised of starch, protein and fat.

27. The oil extracted dry powder food product according to claim 23 wherein the vegetable flour is comprised of starch.

28. The oil extracted dry powder food product according to claim 23 wherein the vegetable flour is comprised of protein.

29. The oil extracted dry powder food product according to claim 23 wherein the vegetable flour is comprised of starch and protein.

30. The oil extracted dry powder food product according to claim 23 wherein the vegetable flours are mixed with protein from animal source materials, yeast, and grain flour protein.

31. The oil extracted dry powder food product according to claim 23 wherein the $\Delta E^*ab$ of the roux and the $\Delta E^*ab$ color of the dry powder food product plus readded extracted oil has essentially the same color ±2%.

32. A corn chip comprised of corn flour or masa and an oil extracted dry powder food product having a definitive fried flavor, the dry powder food product substantially oil free from an oil extracted dry powder food product having, a definitive fried flavor, the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a $L^*$ $a^*$ $b^*$ color space, the reduced $\Delta E^*ab$ color being the result of the absence of the extracted oil;

retention of the specific fried flavor of the roux is in the carbohydrates of the dry powder food product; and the dry powder food product plus the readdition of the extracted oil has essentially the same color as the roux as measured by the $\Delta E^*ab$.

33. An extruded or formed chip comprised of grain flour or vegetable flour and an oil extracted dry powder food product having a definitive fried flavor, the dry powder food product substantially oil free from an oil extracted caramelized roux of grain flour and vegetable flour and oil mixture;

the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a L* a* b* color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

34. The extruded or formed chip according to claim 33 wherein the oil extracted dry powder food product is comprised of dairy protein powder.

35. The extruded or formed chip according to claim 33 wherein the oil extracted dry powder food product is comprised of cheese.

36. The extruded or formed chip according to claim 33 wherein the chip is comprised of potato starch.

37. A coating flavor carrier for formed or extruded chips comprising an adhesive dry powder food product having definite fried flavor and correlatable color;

the dry powder food product substantially oil free from an oil extracted caramelized roux of vegetable flour and oil mixture;

the roux having a fried flavor correlatable to a specific color and the oil extracted dry powder food product having the fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a L* a* b* color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

38. A fried flavor carrier coated vegetable chip comprising vegetable chip coated with an adhesive dry powder food product having a fried flavor;

the dry powder food product substantially oil free, from an oil extracted caramelized roux of vegetable flour and oil mixture;

the roux having a fried flavor correlatable to a specific color and the oil extracted dry powder food product having the fried flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a L* a* b* color space, the reduced $\Delta E^*ab$ color being the result of the absence of the extracted oil;

retention of the specific fried flavor of the roux is in the carbohydrates of the dry powder food product; and the dry powder food product plus readdition of the extracted oil has essentially the same color as the roux as measured by the $\Delta E^*ab$.

39. The fried flavor carrier coated vegetable chip according to claim 38 wherein the vegetable chip is potato.

40. The fried flavor carrier coated vegetable chip according to claim 38 wherein the fried flavor is achieved without oil frying.

41. A protein food supplement comprised of a dry powder food product substantially oil flee from an oil extracted caramelized roux of a food protein and oil mixture;

the roux having a peak flavor correlatable to a specific color and the oil extracted dry powder food product having the peak flavor of the roux and a color of a reduced $\Delta E^*ab$, the $\Delta E^*ab = \sqrt{(\Delta L^*)^2 + (\Delta a^*)^2 + (\Delta b^*)^2}$, indicating a degree of color difference in a L* a* b* color space, the reduced $\Delta E^*ab$ color being the result of the absence of the extracted oil;

retention of the specific peak flavor of the roux is in the carbohydrates of the dry powder food product; and the dry powder food product plus readdition of the extracted oil has essentially the same color as the roux as measured by the $\Delta E^*ab$.

42. A method for producing a substantially oil free definitive flavor dry powder from a definitive flavored caramelized roux of vegetable flour and oil mixture, comprising:

preparing a roux base having a definitive fried flavor, the roux base comprised of a caramelized flour and shortening mixture having a ratio of from about 75:25 to about 25:75 by weight flour to shortening, the roux base as a result of heating, mixing, caramelizing and quenching of the mixture, having a color being correlatable to the definitive flavor;

extracting the oil from the caramelized roux base to a level of from about 95% to about 99.5% oil by weight;

producing a dry powder food product substantially oil free from the oil extracted caramelized roux base of vegetable flour and oil mixture, the roux base having a fried flavor correlatable to a specific color and the oil extracted dry powder food product having the fried flavor of the roux base and a color which is correlatable to the color of the roux base upon readdition of the extracted oil; and retaining the definitive fried flavor of the roux in the dry powder food product.

43. A method for producing a substantially oil free definitive flavor dry powder according to claim 42 wherein the extracting of the oil from the caramelized roux base to a level of from about 95% to about 99.5% oil by weight through solvent extraction of the oil from the roux.

44. A method according to claim 43 wherein the extraction solvent is comprised of normally gaseous hydrocarbons in a liquid phase.

45. A method for producing a substantially oil free definitive flavor dry powder according to claim 42 wherein the retention of the definitive flavor is in the carbohydrates of the dry powder food product.

46. A method for producing a substantially oil free definitive flavor dry powder according to claim 42 wherein the definitive flavor is a fried flavor of varying intensity which varies with color intensity.

47. A method for producing a substantially oil free definitive flavor dry powder wherein the dry powder is free of moisture and the method increases the adhesion of the moisture free substantially oil free dry powder food product to a dry food surface by at least 60% or greater than dry flour.

* * * * *